(12) United States Patent
Billinger et al.

(10) Patent No.: US 8,453,972 B2
(45) Date of Patent: Jun. 4, 2013

(54) DEVICE FOR CONNECTING MOVABLE PARTS WITH STRUCTURAL ELEMENTS OF AIRPLANES OR THE LIKE

(75) Inventors: Wolfgang Billinger, Ried (AT); Walter A. Stephan, St. Martin (AT)

(73) Assignee: FACC AF, Ried im Innkreis (AT)

( * ) Notice: Subject to any disclaimer, the term of this patent is extended or adjusted under 35 U.S.C. 154(b) by 496 days.

(21) Appl. No.: 10/053,666

(22) Filed: Jan. 24, 2002

(65) Prior Publication Data
US 2002/0100840 A1 Aug. 1, 2002

(30) Foreign Application Priority Data

Jan. 26, 2001 (AT) .................................. A 131/2001
Oct. 10, 2001 (EP) ...................................... 01890290

(51) Int. Cl.
*B64C 3/20* (2006.01)
*B64C 1/06* (2006.01)

(52) U.S. Cl.
USPC ........................................ 244/123.1; 244/131

(58) Field of Classification Search
USPC ................. 244/131, 133, 123, 124, 34 R, 38, 244/37, 200, 211–213, 215, 39
See application file for complete search history.

(56) References Cited

U.S. PATENT DOCUMENTS

| | | | | |
|---|---|---|---|---|
| 3,102,559 | A * | 9/1963 | Koppelman et. al. | 139/384 R |
| 4,213,587 | A | 7/1980 | Roeseler et al. | 244/213 |
| 4,243,189 | A | 1/1981 | Ohgi | 244/75 R |
| 4,275,122 | A * | 6/1981 | Fisher | 428/542.8 |
| 4,966,802 | A * | 10/1990 | Hertzberg | 428/119 |
| 5,098,043 | A | 3/1992 | Arena | 244/215 |
| 5,224,670 | A * | 7/1993 | Padden | 244/123.3 |
| 6,136,236 | A | 10/2000 | Boccard et al. | 264/40.1 |
| 6,234,423 | B1 * | 5/2001 | Hirahara et al. | 244/123.7 |
| 2001/0017336 | A1 * | 8/2001 | Hirahara et al. | 244/123 |

FOREIGN PATENT DOCUMENTS

| | | |
|---|---|---|
| DE | 195 36 675 | 2/1997 |
| DE | 199 09 257 | 9/2000 |
| EP | 0 532 016 | 3/1993 |

OTHER PUBLICATIONS

"Elevator (aircraft)." Wikipedia, The Free Encyclopedia. Apr. 22, 2006, 07:14 UTC. May 2, 2006, 20:58 <http://en.wikipedia.org/w/index.php?title=Elevator_%28aircraft%29&oldid=49563168>.*
"Fitting." Wikipedia, The Free Encyclopedia. Aug. 20, 2005, 03:55 UTC. May 2, 2006, 21:00 <http://en.wikipedia.org/w/index.php?title=Fitting&oldid=21409986>.*
"Screw." Wikipedia, The Free Encyclopedia. Jan. 20, 2007, 09:04 UTC. Wikimedia Foundation, Inc. Jan. 23, 2007 <http://en.wikipedia.org/w/index.php?title=Screw&oldid=101969652>.*
"Rivet." Wikipedia, The Free Encyclopedia. Jan. 22, 2007, 17:02 UTC. Wikimedia Foundation, Inc. Jan. 23, 2007 <http://en.wikipedia.org/w/index.php?title=Rivet&oldid=102461232>.*
"Bearing (mechanical)." Wikipedia, The Free Encyclopedia. Jan. 19, 2007, 19:39 UTC. Wikimedia Foundation, Inc. Jan. 23, 2007 <http://en.wikipedia.org/w/index.php?title=Bearing_%28mechanical%29&oldid=101844988>.*

* cited by examiner

*Primary Examiner* — Tien Dinh
(74) *Attorney, Agent, or Firm* — Jacobson Holman PLLC (57) ABSTRACT

A device for connecting movable parts with structural components of airplanes or other high-speed vehicles, including at least one fitting provided with at least one bearing. In order to provide such a device exhibiting low thermal stresses, a low weight, a high bearing capacity and a producibility as simple as possible, it is provided that the at least one fitting is made of a synthetic material and glued with the movable part. The resin transfer molding (RTM)-method is particularly suitable to produce the fitting.

16 Claims, 7 Drawing Sheets

DEVICE FOR CONNECTING MOVABLE PARTS WITH STRUCTURAL ELEMENTS OF AIRPLANES OR THE LIKE

BACKGROUND OF THE INVENTION

1. Field of the Invention

The invention relates to a device for connecting movable parts with structural components of airplanes or the like, including at least one fitting provided with at least one bearing.

The device according to the invention is applicable for airplanes, helicopters and other aircraft as well as for other vehicles such as, e.g., high-speed ships or high-speed cars. The term "movable parts" serves to denote, in particular, spoilers, landing flaps, control surfaces or the like, which are required to control an airplane or the like and to assist in the take-off, landing and moving procedures. Spoilers are interference flaps provided on the rear upper sides of the wings of airplanes, which, on the one hand, serve as braking flaps during landing and, on the other hand, also assist the aileron if used asymmetrically.

The spoiler produces a resistance which destroys part of the ascending force. The term "structural components", above all, encompasses the airfoils of airplanes or the like. The invention is, however, also applicable to helicopters, in which the wing is formed by a rotor blade including movable control flaps.

2. Prior Art

Movable parts such as spoilers, landing flaps, control surfaces or the like are usually connected with fittings made of metals such as, for instance, aluminum or titanium alloys. The connection of the fittings with the movable part in most cases is realized by the aid of rivets or detachable screw connections. The fitting includes at least one bearing via which the movable connection with the structural component such as, for instance, the wing, is effected. Since extremely high loads act on the movable parts and hence the fittings of, in particular, an airplane, these must be especially stable. The fittings, which are mostly made of the materials mentioned by forging or milling, are very expensive in terms of production. In order to lower fuel expenses, it is constantly aimed to further reduce the weight of airplanes or the like. By producing various components and also spoilers, landing flaps, control surfaces or the like of synthetic materials and, in particular, composite materials, a considerable reduction of the weight of such airplanes or the like has already been reached. The interface between a part made of a synthetic material and a fitting made of a metal is subject to undesired dynamic effects due to different thermal expansions of the components. With the materials usually used in aircraft technology, this problem is particularly evident, since composite material have negative temperature coefficients, while aluminum or titanium alloys have positive temperature coefficients. On account of the particularly high temperature deviations of between about −70° and +80° faced primarily in aviation, accordingly high shearing forces act on the connecting elements between such synthetic components and metal fittings. As a result, a higher number of connecting elements like screws or rivets must be provided. Usually, even one third of all connecting elements is employed merely because of the shearing forces caused by different thermal expansions. In addition to an increased complexity and elevated costs, the higher number of connecting elements also involves higher weights.

U.S. Pat. No. 4,213,587 A discloses an articulated connection between flaps and structural components, which is comprised of a fitting anchored in the structural component and screwed therewith and a bearing pin anchored in the movable part. Due to the different thermal expansion coefficients mentioned above, undesired stresses occur between the fitting and the structural component as well as the fitting and the movable part. Moreover, the anchorage and assemblage of the fitting parts with the structural component and the movable part are very cumbersome with the respective parts exhibiting high weights.

Also U.S. Pat. No. 5,098,043 A discloses a movable connection between an wing and a control surface, in which a fitting is connected with the flap via structural components provided in the control surface and is rotatably mounted on the wing via a pin. The aforementioned problems faced by different thermal expansions and the weight involved apply also in that case.

A connecting means used to connect a movable flap with a rotor blade of a helicopter is described in DE 199 09 257 A1, wherein the flap is connected with the rotor blade or wing via a torsionally elastic and deflection-resistant rod element. The connection between the rod element and the wing or the flap, respectively, is realized by means of an adhesive and/or by screws. The torsionally elastic and deflection-resistant rod element advantageously is made in one piece of a glued fiber composite material. Such a torsionally elastic and deflection-resistant rod element, however, allows for only slight movements of the flap relative to the rotor blade, which would be too small for the application of spoilers or landing flaps or the like in aircraft.

U.S. Pat. No. 4,243,189 A shows a temperature-compensated connection between a wing and an elevator, which is comprised of different materials having different thermal expansion coefficients. The different expansion values are compensated by the arrangement of articulately connected supports. The construction is, however, very complex and also unable to avoid the problems involved in the connections of the supports with the airfoil or the elevator.

EP 532 016 A1 describes a spoiler for the wing of an airplane, which comprises fittings that are connected with the spoiler in a manner so as to minimize the shearing forces. That connection is achieved by a special geometric configuration of the attachment surfaces of the fittings as well as the lower side of the spoiler, to which the fittings are fastened.

SUMMARY OF THE INVENTION

It is, therefore, the object of the present invention to provide a device of the initially defined kind, for connecting movable parts with structural components of airplanes or the like, which is able to reduce or avoid the drawbacks caused by the thermal expansion of known devices and which, in addition, offers a low weight, a loading capacity as high as possible and a producibility as simple as possible. Moreover, the device is to exhibit good long-duration properties.

In accordance with the invention, this object is achieved in that the at least one fitting is made of a synthetic material, preferably a composite material, and glued with the movable parts. Thus, a low weight of the fitting itself is obtained, on the one hand, and a slight difference between the thermal expansion of the fitting and the thermal expansion of the movable part is safeguarded, on the other hand. By the present invention, the material interface between synthetic material and metal is accordingly shifted from the connection between movable part and fitting into the bearing. The bearing usually is designed as a movable or fixed bearing combination and better apt to absorb thermal stresses. Due to the reduced thermal expansion differences, the demands set on the connection between the fitting and the movable part are accordingly smaller, whereby the number of connecting elements and hence also the weight may be reduced. In addition, the expensive and complexly designed, usually forged or milled, fittings of aluminum and titanium alloys are no longer required. Besides, components made of synthetic materials exhibit a higher corrosion resistance than metal parts.

According to another characteristic feature of the invention, it is provided that the fitting is made of the same material as the movable part. As a result, both the movable part and the fitting exhibit the same thermal expansion, thus avoiding shearing forces acting on the connecting elements of the fittings with the movable part.

Although it is aimed to do without any additional connecting elements, further connecting elements like rivets or screws may be provided beside the glued joint to back the connection between the movable part and the fitting. Yet, only a smaller number of such connecting elements is required as compared to conventional devices, since, as already mentioned, shearing forces do not act on the connecting elements between the fitting and the movable part and, therefore, need not be taken into consideration. Consequently, savings to as much as half of the usual number of connecting elements are feasible.

According to a further characteristic feature of the invention, it is provided that the fitting is made of a synthetic material according to the resin transfer molding (RTM)-method. This production method renders feasible the formation of complex three-dimensional components having special properties. The resin transfer molding technique offers advantages in view of conventional production methods, employing an autoclave to solidify the prepreg material. U.S. Pat. No. 6,136,236 A, for instance, describes a method for producing components of composite materials according to the resin transfer molding method. Also DE 195 36 675 C1 describes a device and a method for producing large-surface components according to the RTM-method.

Advantageously, the fitting comprises a carbon fabric as a reinforcement means. Carbon fibers offer advantages in terms of weight and strength properties.

If reactive materials such as, e.g., nylon, are sewed or woven into the carbon fabric, certain properties such as strength or impact strength will be enhanced. The carbon fabric used may, for instance, be interwoven with nylon and the nylon material can dissolve after the addition of resin so as to enhance the impact strength.

If an indentation is provided in the movable part, the fitting is preferably arranged in said indentation and glued with the movable part. In this manner, short fittings may preferably be connected with movable parts. The gluing between the fitting and the movable part may be effected in places or over the entire contact surface.

Similarly, the fitting may be arranged in a recess provided in the movable part and glued with the same. The recess has a shape complementary to the fitting and optimally encloses the fitting arranged therein, thus offering a perfect support.

In order to provide for an even further enhanced support, the fitting is preferably arranged between an upper and a lower covering layer of the movable part and, preferably, also glued with the same. The covering layers advantageously are made of a fiber-reinforced fabric, while the component located therebetween may be a light-weight component, for instance a honeycomb core.

According to a further characteristic feature of the invention, it is provided that the fitting and the movable part are produced in one piece. This is readily feasible, in particular, with small movable parts and, in particular, according to the RTM method, wherefore the connecting parts between the fitting and the movable part are obviated completely and also the shearing forces caused by thermal stresses are eliminated.

BRIEF DESCRIPTION OF THE DRAWINGS

In the following, the invention will be explained in more detail by way of the annexed drawings. Therein.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

Figure 1:
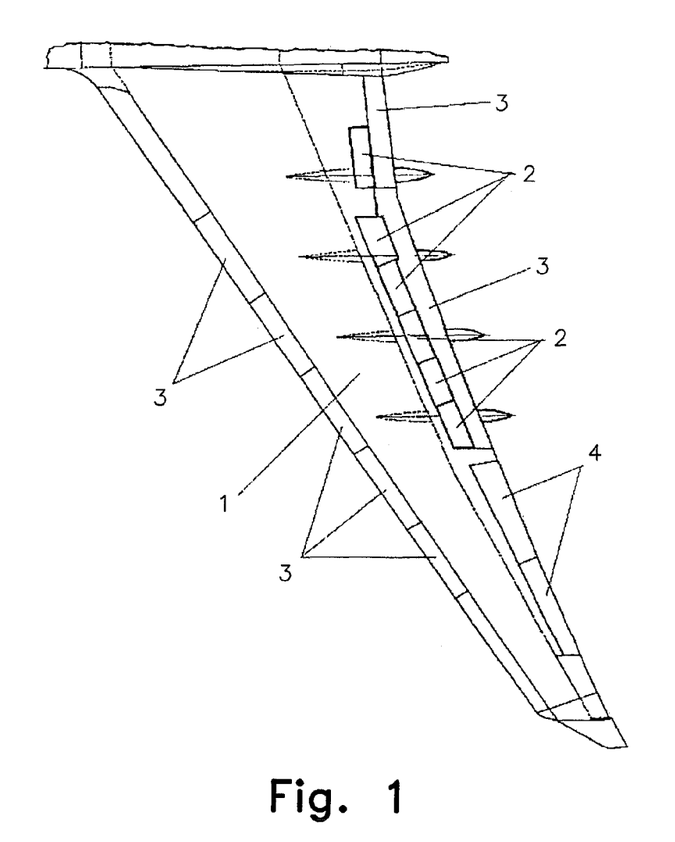
FIG. 1 is a top view on a wing of an airplane.

FIG. 1 depicts a wing 1 of an airplane, viewed from top. On the rear side of the wing 1 are arranged various movable parts like spoilers 2, landing flaps 3, slats 3' and control surfaces 4, which are required to control the airplane.

Figure 2:
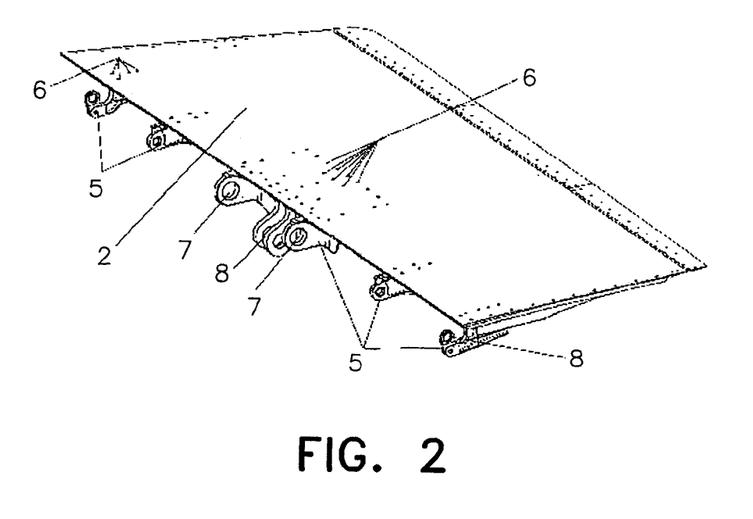
FIG. 2 is a perspective view of a wing component according to the prior art.

FIG. 2 is a perspective view of a movable part, for instance a spoiler 2, which is connected with the wing 1 in a pivotal manner. To the spoiler 2 are fastened several fittings 5 via rivets 6 or the like. On account of the relatively high loads exerted on the spoiler 2, in particular during the landing of an airplane, and also the thermal stresses mentioned, a relatively large number of rivets 6 is required to connect the fittings 5 with the spoiler 2. The fittings 5 contain one or several bearings 7 for the articulated connection with the wing 1. Besides the bearings 7, also articulation points 8 are provided to introduce the movements of the spoiler 2 at the fittings 5. The fittings 5 are usually made of aluminum or titanium alloys by way of forging or milling. Their production is accordingly cumbersome and expensive. Similarly, the weight of the fittings 5 and of the connecting elements such as, e.g., rivets 6 is relatively high. Due to the different thermal expansions of the spoiler 2, which in most cases is made of a composite material, and of the fittings 5, which are made of a metal, high shearing forces act on the connecting elements like rivets 6, wherefore an even higher number of connecting elements is required.

Figure 3:
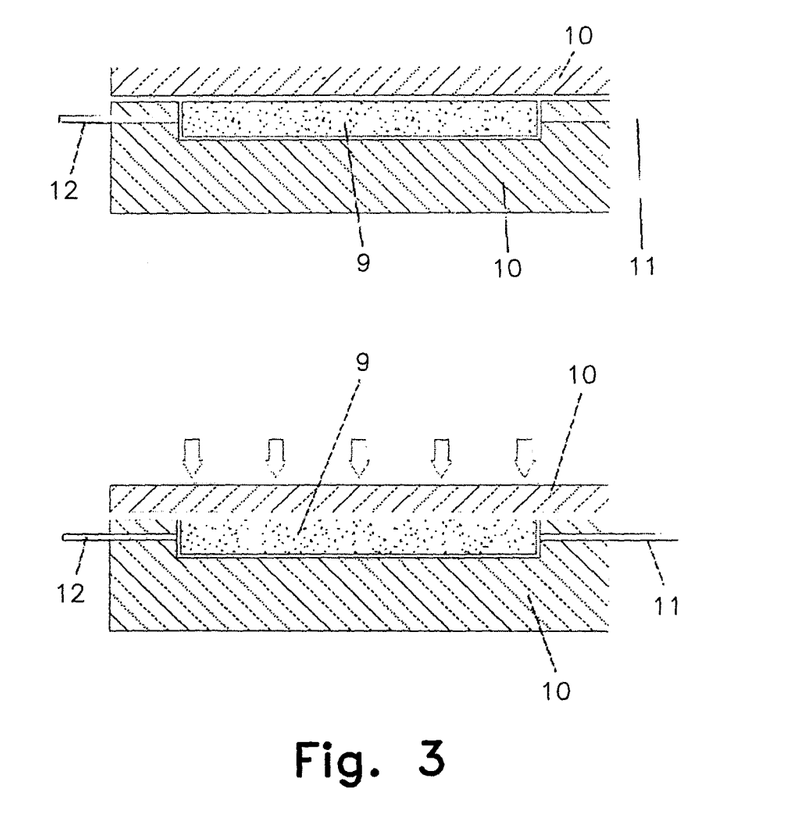
FIG. 3 elucidates the principle of the resin transfer molding method.

FIG. 3 elucidates the principle of the resin transfer molding method (RTM), in which dry fibers 9 are introduced into a mold 10 corresponding to the article to be produced. The air can be sucked off the mold 10 via appropriate ducts 11. This enables the special resin supplied through a supply duct 12 to better get into the mold and intersperse the fabric 9, at a relatively low viscosity. The mold 10 is subsequently heated in order to further lower the viscosity of the resin and ensure an undisturbed flow of the resin into the mold 10. After this, the resin impregnating the fabric 9 solidifies. According to the RTM method, complex articles are readily and rapidly manufacturable at relatively low costs. Optional reactive materials sewed or woven into the fabric 9 can be readily introduced into the mold and develop certain properties during the introduction of the resin. Thus, it is, for instance, possible to dissolve, by means of the resin, nylon interwoven with the fabric 9 and thereby enhance the impact strength of the article produced.

Figure 4:
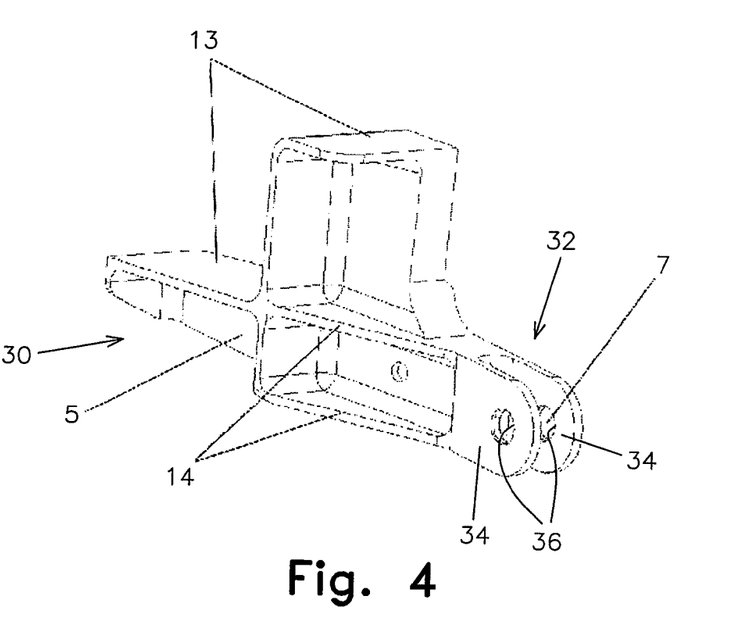
FIG. 4 is a perspective view of a fitting produced according to the invention and including a joint.

FIG. 4 illustrates a fitting 5 according to the invention produced of a composite material according to the RTM method and including a movable part mounting structure generally designated by the reference numeral 30, and a structural component connecting part generally designated by the reference numeral 32. As shown, the structural component connecting part of the fitting includes one or more arms 34 having an aperture 36 therethrough that extend outwardly in a direction away from the movable part mounting structure 30. The fitting 5 defines a bearing surface 7 configured to receive at least one bearing (not shown) and includes attachment surfaces 13 for connection with the movable part such as, e.g., spoiler 2. The connection with the movable part is effected by gluing and optionally additional connecting elements like screws or rivets. In addition, reinforcement structures 14 may be provided in the fitting 5 to enhance the strength of the fitting 5 without substantially increasing its weight and volume.

Figure 5:
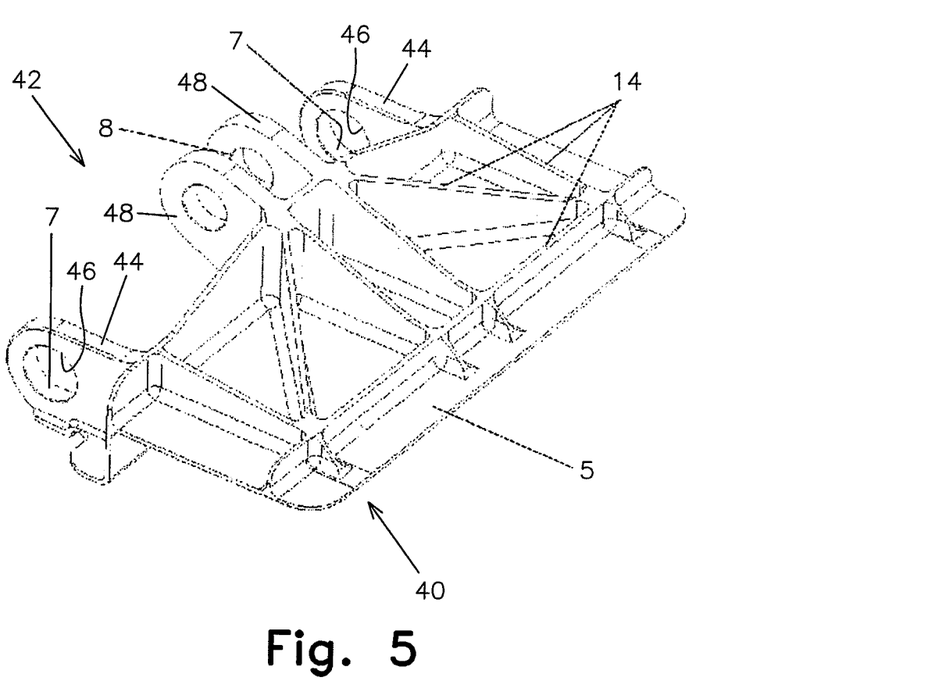
FIG. 5 is a perspective view of another embodiment of a fitting comprising two alloys and a cylinder hinge point.

Finally, FIG. 5 depicts another embodiment of a fitting 5. As in the embodiment of FIG. 4, the fitting includes a movable part mounting structure generally designated by the reference numeral 40, and a structural component connecting part generally designated by the reference numeral 42. As shown in FIG. 5, the structural component connecting part of the fitting includes two arms 44, each having an aperture 46 therethrough, the arms 44 extending outwardly in a direction away from the movable part mounting structure. The inner surfaces of the apertures 46 define two bearing surfaces 7, respectively, that are configured to receive bearings (not shown). The fitting 5 of FIG. 5 also includes two additional arms 48 with articulation point 8 as well as some reinforcement structures 14.

In particular, in the event of small movable parts such as, e.g., spoilers 2, these may be manufactured simultaneously with the production of the fitting 5 in one procedure, preferably according to the RTM method. By RTM method, the properties of the manufactured component can be readily adjusted, optimized and tuned to the respective application. By changing the fiber direction of the fabric, mechanical properties may, for instance, be adjusted or optimized. The present invention stands out for its low weight, high loading capacity and relatively simple producibility.

Figure 6:
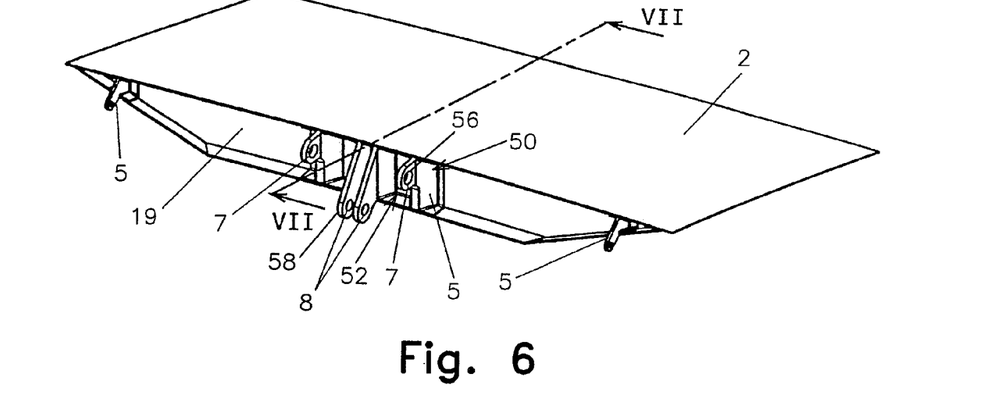
FIG. 6 is a perspective view of a spoiler variant including a fitting according to the invention embedded therein.
Figure 7:
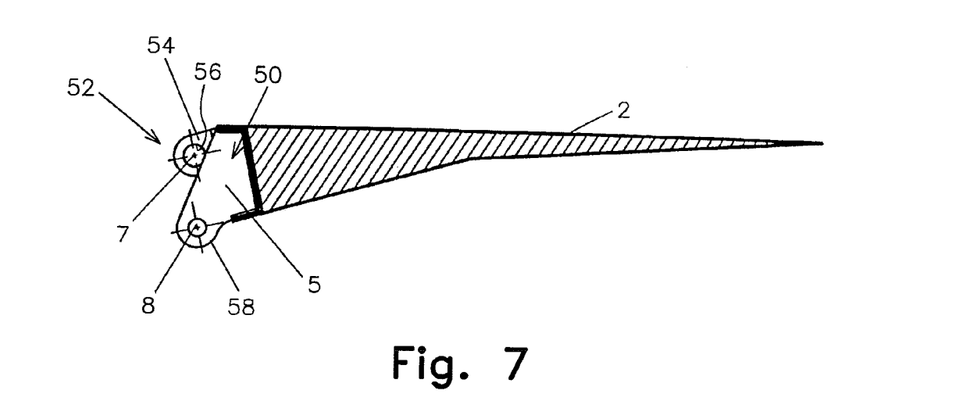
FIG. 7 is a sectional illustration of the spoiler according to FIG. 6 along line VII-VII.

From FIGS. 6 and 7, a variant of a spoiler 2 comprising an embedded fitting and intended, in particular, for airplanes is apparent, which spoiler 2 has an indentation 19 in which the fitting 5 is embedded and fastened by gluing. As with the previous two embodiments, the fitting includes a movable part mounting structure generally designated by the reference numeral 50, and a structural component connecting part generally designated by the reference numeral 52. As shown, the structural component connecting part of the fitting includes two arms 54, each having an aperture 56 therethrough, the arms 54 extending outwardly in a direction away from the movable part mounting structure 50. The inner surfaces of the apertures define bearing surfaces 7, each of which is provided with one or more bearings (not shown). Additional arms 58 are also provided that define articulation points 8. This variant is characterized by a particularly short fitting 5, resulting in a relatively low overall weight. Gluing between the movable part mounting structure 50 of the fitting 5 and the spoiler 2 may be realized only on parts of the contacting surfaces between the fitting 5 and the spoiler 2 or over the entire contacting surface.

Figure 8:
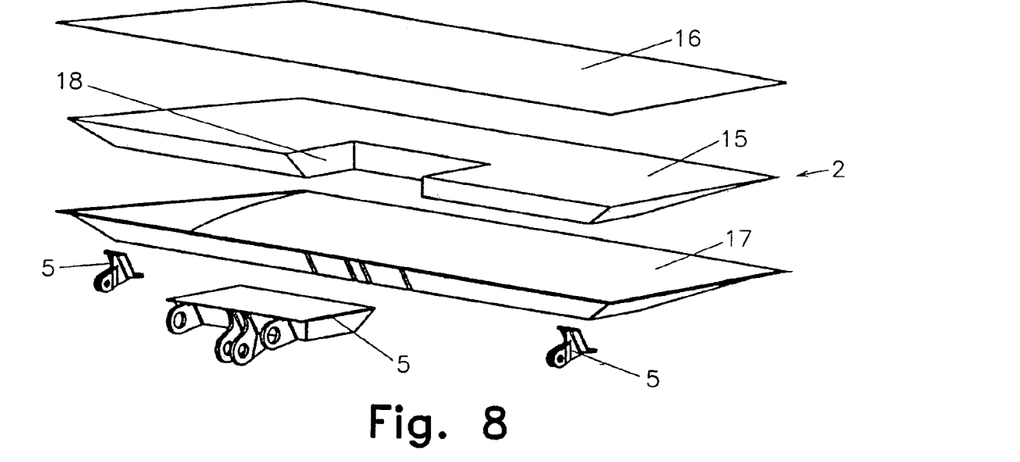
FIG. 8 is a perspective explosive view on a spoiler having an integrated fitting.
Figure 9:
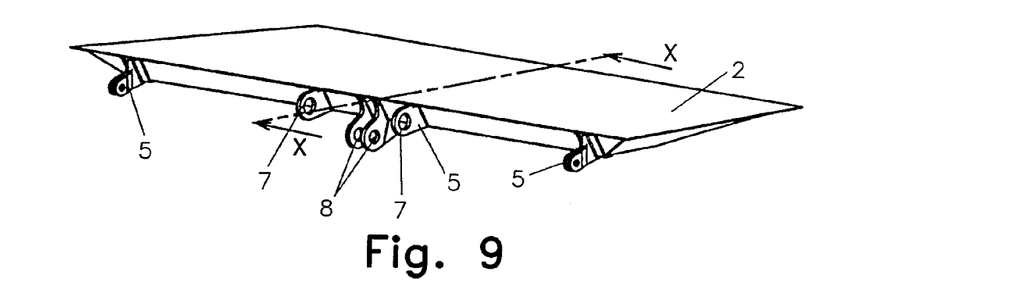
FIG. 9 shows the spoiler according to FIG. 8 in the assembled state.
Figure 10:
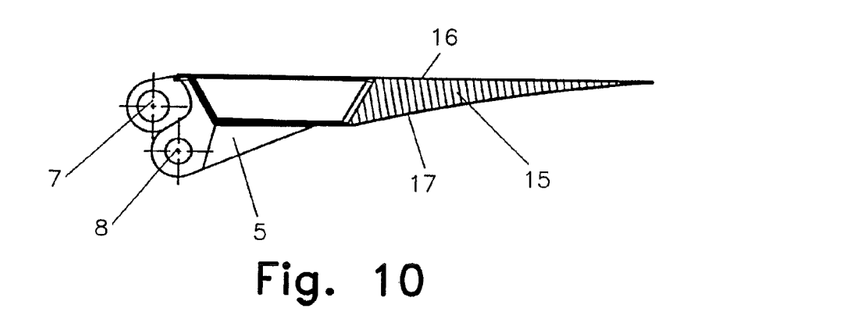
FIG. 10 is a sectional illustration of the spoiler according to FIG. 9 along line X-X.

FIGS. 8 to 10 illustrate a further variant of a spoiler 2 intended, in particular, for airplanes, in which the fitting 5 produced according to the invention of a synthetic material is integrated in the spoiler 2 and glued therewith. FIG. 8 shows the basic structure of a spoiler 2 made of a composite material and comprising a lightweight core 15, for instance a honeycomb core, which is covered by an upper covering layer 16 and a lower covering layer 17, preferably of impregnated fiber fabrics. The lightweight core 15 has a recess 18 corresponding to the size of the fitting 5, into which the fitting 5 is inserted prior to the assemblage of the spoiler 2 by gluing of the lightweight core 15 with the covering layers 16 and 17, and is preferably glued both with the lightweight core 15 and the covering layers 16, 17. This variant of a wing component is characterized by a deeper fitting 5 and hence larger weight, yet withstands higher loads.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What we claim is:

1. A connecting device used in an aircraft to connect a movable part of said aircraft with a structural component of said aircraft, said connecting device comprising at least one fitting having a movable part mounting structure and a structural component connecting part so as to be configured to connect said movable part with said structural component, said structural component connecting part of said fitting including at least one arm extending outwardly in a direction away from said movable part mounting structure and having an aperture therethrough, an inner diameter of said aperture defining a bearing surface configured to receive at least one bearing, and glue securing said movable part mounting structure of said fitting to said movable part, said fitting being made of a synthetic composite material according to a resin transfer molding method and including a carbon fabric as a reinforcement element, said composite material being a same material as that from which said movable part is made, said movable part being selected from the group consisting of a spoiler, a landing flap and a control surface.

2. The device as set forth in claim 1, further comprising a reactive material sewn or woven in said carbon fabric.

3. The device as set forth in claim 2, wherein said reactive material is nylon.

4. The device as set forth in claim 1, further comprising a recess provided in said movable part, said movable part mounting structure of said fitting being embedded in said recess.

5. The device as set forth in claim 4, wherein said movable part includes an upper covering layer and a lower covering layer, said movable part mounting structure of said fitting being arranged therebetween.

6. The device as set forth in claim 5, wherein said movable part mounting structure of said fitting is glued with said upper covering layer and said lower covering layer.

7. The device as set forth in claim 1, further comprising additional connecting means.

8. The device as set forth in claim 7, wherein said additional connecting means include rivets or screws.

9. The device as set forth in claim 1, further comprising an indentation provided in said movable part, wherein said movable part mounting structure of said fitting is embedded in said indentation.

10. The device as set forth in claim 1, wherein said fitting further includes a second arm having an aperture therethrough that defines an articulation point.

11. The device as set forth in claim 10, wherein said arm defining the bearing surface is substantially parallel with said second arm defining the articulation point.

12. A device for connecting a movable part of an aircraft with a structural component of said aircraft, said device comprising a fitting having a movable part mounting structure and a structural component connecting part to connect said movable part to said structural component, said structural component connecting part of said fitting including at least one arm extending outwardly in a direction away from said movable part mounting structure and having an aperture therethrough, an inner diameter of said aperture defining a bearing surface for receiving at least one bearing, and glue that secures said movable part mounting structure of said fitting to said movable part, said movable part being selected from the group consisting of a spoiler, a landing gear and a control surface, and said fitting being made of a same composite material as said movable part.

13. The device as set forth in claim 12, wherein said glue alone secures said fitting to said movable part, there being an absence of any other fastening component.

14. The combination of a fitting for connecting a movable part of an aircraft with a structural component of said aircraft, and said movable part, comprising:

said fitting having a movable part mounting structure and a structural component connecting part, said structural component connecting part of said fitting including at least one arm extending outwardly in a direction away from said movable part mounting structure and having an aperture therethrough that defines a bearing surface for receiving at least one bearing, said fitting being made of a synthetic composite material according to a resin transfer molding method and including a carbon fabric as a reinforcement element;

said movable part also being made of said composite material such that said fitting and said movable part have substantially a same thermal expansion coefficient, said movable part having an upper covering layer and a lower covering layer of fiber reinforced fabric, and said movable part mounting structure of said fitting being arranged therebetween and configured to connect said movable part to said structural component, said movable part being selected from the group consisting of a spoiler, a landing flap and a control surface.

15. The combination as set forth in claim 14, further comprising glue applied to said fitting and/or said movable part to secure said fitting to said movable part.

16. The device as set forth in claim 14, wherein said fitting and said movable part are integrally formed as one piece.

* * * * *